United States Patent
Ast et al.

(10) Patent No.: US 8,186,161 B2
(45) Date of Patent: May 29, 2012

(54) SYSTEM AND METHOD FOR CONTROLLING AN EXPANSION SYSTEM

(75) Inventors: Gabor Ast, Garching (DE); Michael Adam Bartlett, Munich (DE); Thomas Johannes Frey, Ingolstadt (DE); Herbert Kopecek, Hallbergmoos (DE); Helge Burghard Herwig Klockow, Guilderland, NY (US); Matthew Alexander Lehar, Munich (DE)

(73) Assignee: General Electric Company, Niskayuna, NY (US)

( * ) Notice: Subject to any disclaimer, the term of this patent is extended or adjusted under 35 U.S.C. 154(b) by 116 days.

(21) Appl. No.: 11/956,457

(22) Filed: Dec. 14, 2007

(65) Prior Publication Data

US 2009/0151356 A1   Jun. 18, 2009

(51) Int. Cl.
  *F01K 13/02* (2006.01)
  *F01K 7/40* (2006.01)
  *F01K 13/00* (2006.01)
(52) U.S. Cl. ............................. 60/660; 60/667; 60/645
(58) Field of Classification Search .. 73/112.01–112.06, 73/113.01; 60/667, 686, 645, 653, 660, 664, 60/666, 670, 665; 415/1, 17, 26–28, 36, 415/42, 44, 46–50
See application file for complete search history.

(56) References Cited

U.S. PATENT DOCUMENTS

| | | | | |
|---|---|---|---|---|
| 4,005,581 A * | 2/1977 | Aanstad | | 60/660 |
| 4,117,344 A * | 9/1978 | Boerstler et al. | | 290/52 |
| 4,471,622 A * | 9/1984 | Kuwahara | | 60/667 |
| 4,557,112 A * | 12/1985 | Smith | | 60/651 |
| 4,589,255 A * | 5/1986 | Martens et al. | | 60/646 |
| 4,827,429 A * | 5/1989 | Silvestri, Jr. | | 700/287 |
| 5,082,421 A * | 1/1992 | Acton et al. | | 415/118 |
| 6,981,377 B2 | 1/2006 | Vaynberg et al. | | |
| 2005/0183421 A1 | 8/2005 | Vaynberg et al. | | |
| 2006/0196187 A1 | 9/2006 | Zimron et al. | | |

FOREIGN PATENT DOCUMENTS

GB   2427002 A   12/2006
WO   2006/104490 A1   10/2006

* cited by examiner

*Primary Examiner* — Thomas Denion
*Assistant Examiner* — Christopher Jetton
(74) *Attorney, Agent, or Firm* — Ann M. Agosti

(57) ABSTRACT

A control system includes a temperature sensor communicatively coupled to an exit of an expander of an expansion system and configured to detect temperature of the working fluid flowing through the exit of the expander. A pressure sensor is communicatively coupled to the exit of the expander and configured to detect pressure of the working fluid flowing through the exit of the expander. A controller is configured to receive output signals from the temperature sensor and the pressure sensor and control operation of one or more components of the expansion system so as to control the thermodynamic conditions at the exit of the expander while driving a quality of vapor of the working fluid at the exit of the expander towards a predetermined degree of superheat.

6 Claims, 5 Drawing Sheets

SYSTEM AND METHOD FOR CONTROLLING AN EXPANSION SYSTEM

The subject matter disclosed herein relates generally to a waste heat recovery system, and, more particularly, to a system and method for controlling thermodynamic conditions at an expander exit.

Many power requirements could benefit from power generation systems that provide low cost energy with minimum environmental impact and that may be readily integrated into existing power grids or rapidly sited as stand-alone units. Combustion engines such as micro-turbines or reciprocating engines generate electricity at lower costs using commonly available fuels such as gasoline, natural gas, and diesel fuel. However, atmospheric emissions such as nitrogen oxides (NOx) and particulates are generated.

One method to generate electricity from the waste heat of a combustion engine without increasing the output of emissions is to apply a bottoming cycle. Bottoming cycles use waste heat from a heat source, such as an engine, and convert that thermal energy into electricity. Rankine cycles are often applied as the bottoming cycle for combustion engines. Rankine cycles are also used to generate power from geothermal or industrial waste heat sources. A fundamental organic Rankine cycle includes a turbogenerator, a preheater/boiler, a condenser, and a liquid pump.

Such a cycle may accept waste heat at higher temperatures (e.g. above the boiling point of an organic working fluid circulated within the cycle) and typically rejects heat at reduced temperature to the ambient air or water. The choice of working fluid determines the temperature range and thermal efficiency characteristics of the cycle.

For operating an organic rankine cycle, the flow of working fluid through a turbine is an important parameter in order to ensure proper operation of the turbine and also to operate the organic rankine cycle at an optimal efficiency. In conventional systems, the flow of working fluid through the cycle is controlled either by using a variable speed pump or by using a by-pass path around the pump so as to maintain the mass flow of working fluid within the cycle to a predetermined value. It is known to control the working fluid expander inlet vapor quality and maintain a predetermined degree of superheat. However, in the conventional systems, a recuperator is used or the condenser is controlled to desuperheat the working fluid before the fluid condenses. Both options in conventional systems require larger heat transfer areas, resulting in increased investment costs and lower efficiency.

There is a need to effectively control thermodynamic conditions at an exit of an expander in an expansion system, such as an organic rankine cycle system.

BRIEF DESCRIPTION

In accordance with one exemplary embodiment of the present invention, a control system configured to control thermodynamic conditions at an exit of an expander in an expansion system is disclosed. The control system includes a temperature sensor communicatively coupled to an exit of an expander of the expansion system and configured to detect temperature of the working fluid flowing through the exit of the expander. A pressure sensor is communicatively coupled to the exit of the expander and configured to detect pressure of the working fluid flowing through the exit of the expander. A controller is configured to receive output signals from the temperature sensor and the pressure sensor and control operation of one or more components of the expansion system while driving a quality of vapor of the working fluid at the exit of the expander towards a predetermined degree of superheat. In one embodiment, the predetermined degree of superheat is zero (in this embodiment, the quality of the vapor of the working fluid is one).

In accordance with another exemplary embodiment of the present invention, a waste heat recovery system having a control system configured to control thermodynamic conditions at an exit of an expander in a rankine cycle system is disclosed.

In accordance with yet another exemplary embodiment of the present invention, a method for controlling thermodynamic conditions at an exit of an expander of an expansion system is disclosed. The method includes detecting temperature of the working fluid flowing through an exit of an expander of the expansion system. Pressure of the working fluid flowing through the exit of the expander of the expansion system is also detected. Operation of one or more components of the expansion system is controlled based on detected temperature and pressure of the working fluid flowing through the exit of the expander so as to maintain a quality of vapor of the working fluid at the exit of the expander at a predetermined degree of superheat.

In accordance with yet another exemplary embodiment of the present invention, a method for controlling thermodynamic conditions at an exit of an expander in a rankine cycle system is disclosed.

DRAWINGS

These and other features, aspects, and advantages of the present invention will become better understood when the following detailed description is read with reference to the accompanying drawings in which like characters represent like parts throughout the drawings, wherein.

Figure 4:
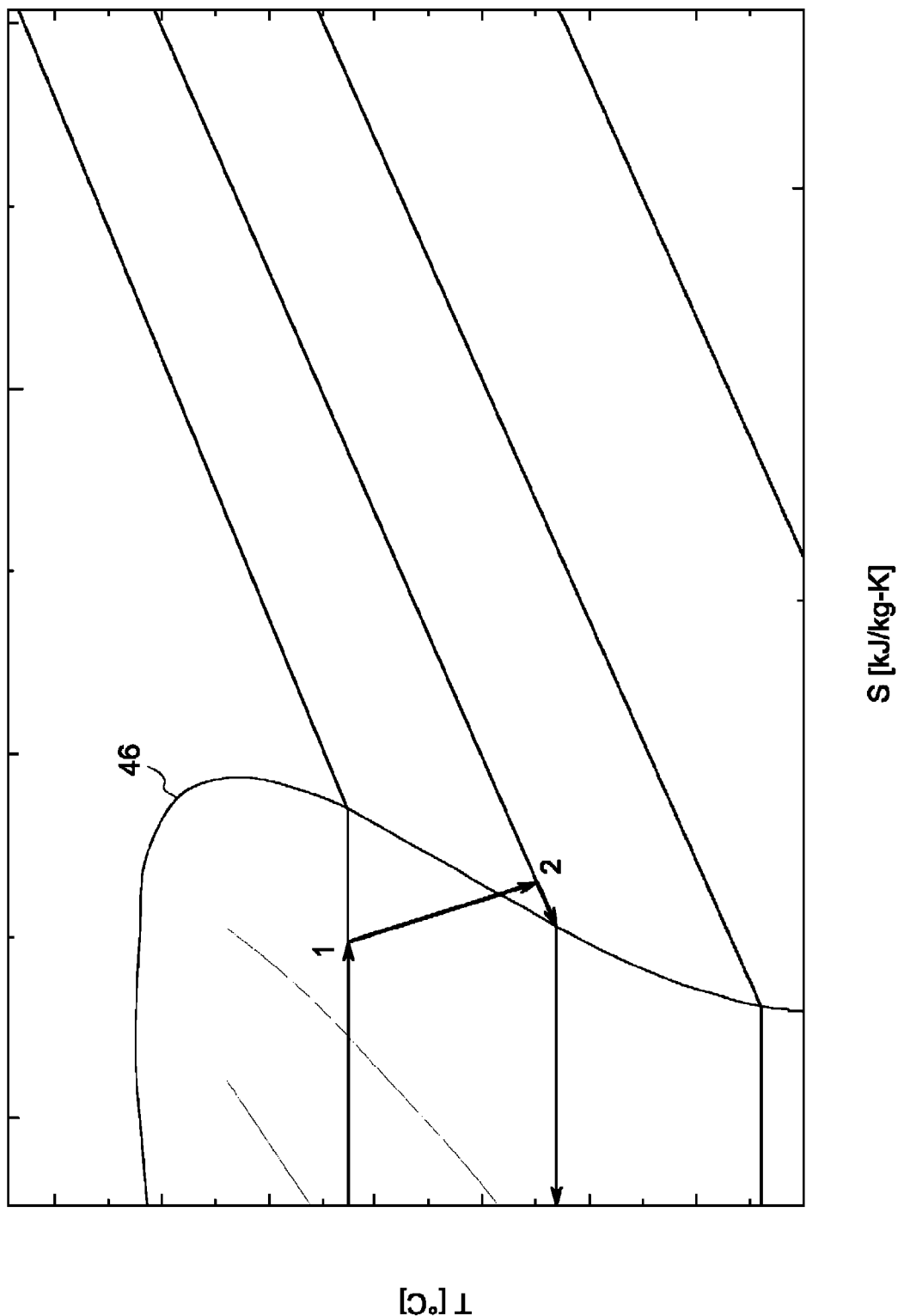
Figure 5:
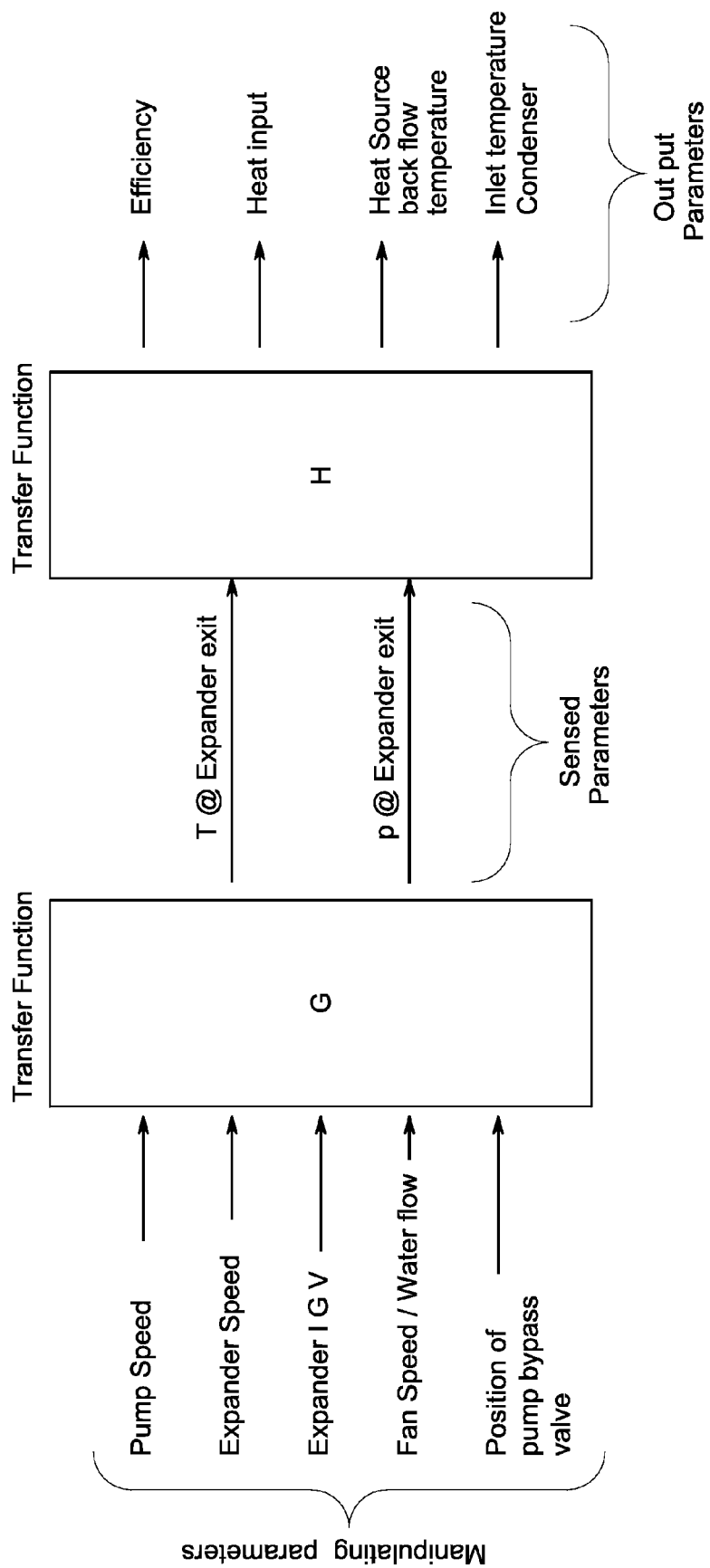

FIG. 4 is a diagrammatical view illustrating variation of temperature versus entropy in accordance with an exemplary embodiment of the present invention; and FIG. 5 is a diagrammatical view illustrating sensed parameters, manipulating parameters, and output parameters for controlling thermodynamic conditions at an exit of an expander in an expansion system in accordance with an exemplary embodiment of the present invention.

DETAILED DESCRIPTION

As discussed in detail below, embodiments of the present invention provide a control system for controlling thermodynamic conditions at an exit of an expander in an expansion system. It should be noted herein that the expansion system may include closed loop system, or an open system, e.g. expansion of a gas stream in a chemical plant or refinery. In one example, the open system may include a geothermal application, where the brine (e.g. 2-phase mixture including water and steam) is expanded in an open loop and not circulated. In one exemplary embodiment, the control system includes a temperature sensor communicatively coupled to an exit of an expander of the expansion system and configured to detect temperature of the working fluid flowing through the exit of the expander. A pressure sensor is also communicatively coupled to the exit of the expander and configured to detect pressure of the working fluid flowing through the exit of the expander. A controller is also configured to receive output signals from the temperature sensor and the pressure sensor and configured to control operation of one or more components of the expansion system so as to drive a quality of vapor of the working fluid at the exit of the expander towards a predetermined degree of superheat. In one embodiment, the predetermined degree of superheat is zero (in this embodiment, the quality of the vapor of the working fluid is one). In another embodiment, the predetermined degree of superheat is set at a value greater than zero. In accordance with another exemplary embodiment of the present invention, a waste heat recovery system having a control system for controlling thermodynamic conditions at an exit of the expander of the recovery system is disclosed. In accordance with another exemplary embodiment of the present invention, a method for controlling thermodynamic conditions at an exit of an expander in an expansion system is disclosed. In accordance with the exemplary embodiments, the thermodynamic conditions at the exit of the expander is set to a predetermined value so that vapor quality of working fluid at the exit of the expander is at a predetermined level of superheat. As a result, optimum performance of the expansion system is realized.

Figure 1:
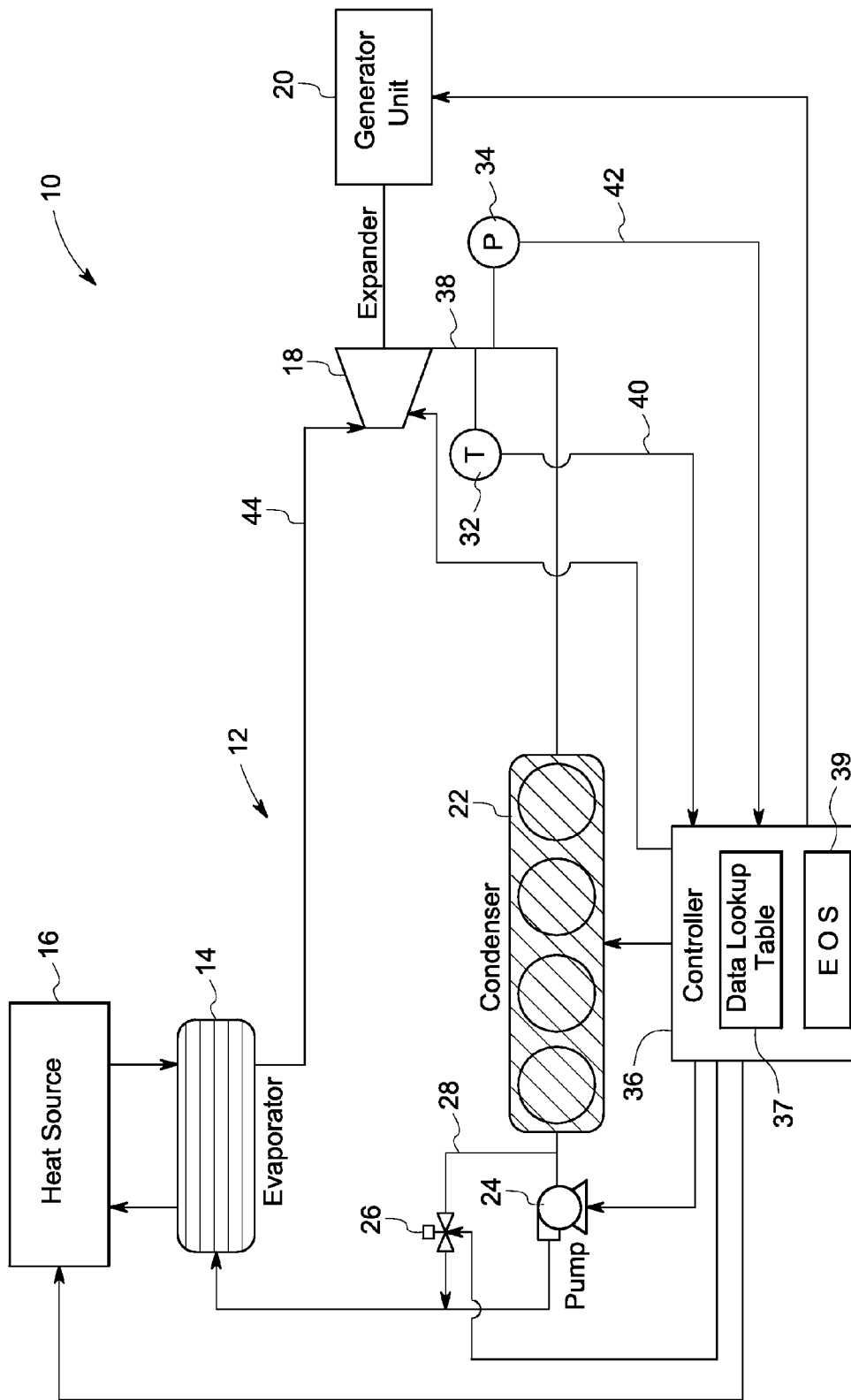
FIG. 1 is a diagrammatical view of an expansion system, for example an organic rankine cycle system having a control system for controlling thermodynamic conditions at an exit of an expander in the rankine cycle system in accordance with an exemplary embodiment of the present invention.

Referring to FIG. 1, an exemplary expansion system 10 is illustrated. In the illustrated embodiment the expansion system is a waste heat recovery system. The illustrated waste heat recovery system 10 includes an organic rankine cycle system 12. An organic working fluid is circulated through the organic rankine cycle system 12. In certain exemplary embodiments, the organic working fluid may include cyclohexane, cyclopentane, thiophene, ketones, aromatics, or combinations thereof. In certain other exemplary embodiments, the organic working fluid may include propane, butane, pentafluoro-propane, pentafluoro-butane, pentafluoro-polyether, oil, other refrigerants, or combinations thereof. It should be noted herein that list of organic working fluids are not inclusive and other organic working fluids applicable to organic rankine cycles are also envisaged. In certain other exemplary embodiments, the organic working fluid includes a binary fluid. The binary fluid may include cyclohexane-propane, cyclohexane-butane, cyclopentane-butane, or cyclopentane-pentafluoropropane, for example. In certain exemplary embodiments, the organic working fluid circulated through organic rankine cycle system 12 may include a mixture of working fluids and lubrication oil (that is, it may comprise a two-phase mixture).

The organic rankine cycle system 12 includes an evaporator 14 coupled to a heat source 16, for example an exhaust unit of a heat source (for example, an engine). In one example, the temperature of the exhaust unit of the engine may be in the temperature range of 400 degrees Celsius to 500 degrees Celsius. In another exemplary embodiment of the present invention, the heat source may include a gas turbine system. In the illustrated embodiment, the evaporator 14 receives heat from the heat source 16 and generates an organic working fluid vapor. In one embodiment, the heat source 16 may include a top cycle of a cascading rankine cycle system. The organic working fluid vapor is passed through an expander 18 (which in one example includes a screw type expander to drive a generator unit 20. In certain other exemplary embodiments, the expander may be axial type expander, impulse type expander, or high temperature screw type expander. After passing through the expander 18, the organic working fluid vapor at a relatively lower pressure and lower temperature is passed through a condenser 22. The organic working fluid vapor is condensed into a liquid, which is then pumped via a pump 24 to the evaporator 14. In one embodiment, the pump 24 is a variable speed pump. In one example, the condensed organic fluid may be supplied to the evaporator 14 at a pressure of 11.3 bars and 95 degrees Celsius. The cycle may then be repeated.

In the illustrated embodiment, a pump bypass control valve 26 is provided in a path 28 for bypassing the pump 24 between the condenser 22 and the evaporator 14 and configured to control the flow of the organic working fluid from the condenser 22 to the evaporator 14. Such a configuration may be used alternatively to a variable speed pump to control the flow of the organic working fluid. The illustrated waste heat recovery system facilitates effective heat removal from the heat source 16. The waste heat is converted into electricity via the organic rankine cycle system. It should be noted herein that the temperature and pressure values discussed above and in subsequent paragraphs are exemplary values and should not be construed as limiting values. The values may vary depending on the applications.

The waste heat recovery system 10 also includes a control system 30 coupled to the heat source 16 and the rankine cycle system 12. Specifically, the control system 30 includes a temperature sensor 32, a pressure sensor 34, and a controller 36. The temperature sensor 32 is coupled to an exit 38 of the expander 18 and configured to detect temperature of the working fluid flowing through the exit 38 of the expander 18. The pressure sensor 34 is also coupled to the exit 38 of the expander and configured to detect pressure of the working fluid flowing through the exit 38 of the expander 18. The controller 36 is configured to receive output signals 40, 42 representative of temperature and pressure from the sensors 32, 34 and control one or more components of the rankine cycle system 12 so as to control thermodynamic conditions at the exit 38 of the expander 18 so as to provide a quality of vapor of the working fluid at the exit 38 of the expander 38 at a predetermined degree of superheat. It should be noted herein that thermodynamic conditions at the exit of the expander may be referred to as "quality of vapor of the working fluid at the exit 38 of the expander 18".

The controller 36 may also be used to adjust the predetermined threshold limits for thermodynamic conditions at the exit of the expander based on one or more parameters related to the organic rankine system. The parameters may include but not limited to temperature of working fluid at the exit of the expander, pressure of working fluid at the exit of the expander, type of working fluid, type of expansion system, system efficiency, amount of heat extracted from the heat source, back flow temperature of heat source, lubrication conditions, condensation temperature, or a combination thereof. The working fluid data obtained from sensors 32, 34 may be mapped with look-up tables 37 or be used in combination with equations of state (EOS) 39 of the corresponding working fluids provided in the controller 36. Adjusting vapor quality at exit of expander to a predetermined degree of superheat allows back-calculation of vapor quality at the inlet of expander based on known expander efficiency, fluid data table/map or equations of state.

As discussed previously, in order to ensure a safe operation of the expander and to operate the rankine cycle at an optimal efficiency, it is required to control thermodynamic conditions at the exit of the expander. For an optimal cycle with high efficiency and smaller heat exchanger areas, the working fluid at the exit 38 of the expander 18 should have a vapor quality of one or only a smaller level of superheat so that the condenser 22 does not need to desuperheat the fluid before condensation. Also, the fluid need not be superheated at the inlet of the expander 18. A variable speed pump, or a control valve in a bypass path of the pump is used to control the mass flow of the working fluid in the system influencing the thermodynamic conditions at the exit of the expander. The operator chooses the threshold limits of thermodynamic conditions at the exit of the expander. Superheat of the working fluid at the exit of the expander is wasted and has to be rejected to the ambient atmosphere in the condenser or has to be recovered using an additional heat exchanger referred to as "recuperator". In accordance with the exemplary embodiment of the present invention, the threshold limits are determined based on parameters such as temperature of working fluid at the exit of the expander, pressure of working fluid at the exit of the expander, type of working fluid, type of expansion system, system efficiency, amount of heat extracted from the heat source, back flow temperature of heat source, lubrication conditions, condensation temperature, or a combination thereof. The controller 36 controls the pump bypass control valve 26, speed of pump 24, condenser 22, speed of expander 18, expander inlet guide vane angle, heat input from heat source 16, or a combination thereof based on detected temperature and pressure of the working fluid at the exit 38 of the expander 18 so as to provide a vapor quality of the working fluid at the exit of the expander 18 at a predetermined level of superheat. In one embodiment, the predetermined degree of superheat is zero. It should be noted herein that controlling condenser 22 may include controlling fan speed or water flow in liquid-cooled condenser. In one embodiment, the expander 18 includes a screw expander without inlet guide vane and without interaction between controller 36 and the screw expander. In another exemplary embodiment, the expansion system may include an open loop without an evaporator.

In certain exemplary embodiments, the expander 18 may be a screw expander lubricated using a mixture of working fluid and oil. In such a case, a separate oil recovery system is provided to the downstream side of the expander. In such embodiments, the controller 36 controls one or more components including pump 24, pump bypass control valve 26, expander 18, condenser 22, heat input from heat generation system 16, or a combination thereof based on detected temperature and pressure of the working fluid at the exit 38 of the expander 18 so as to provide a vapor quality of the working fluid at the exit 38 of the expander 18 approximately equal to one and a vapor quality of the working fluid at an inlet 44 of the expander 18 below one. This ensures sufficient lubrication of the screw expander. As a result, efficiency of the cycle is enhanced.

Figure 2:
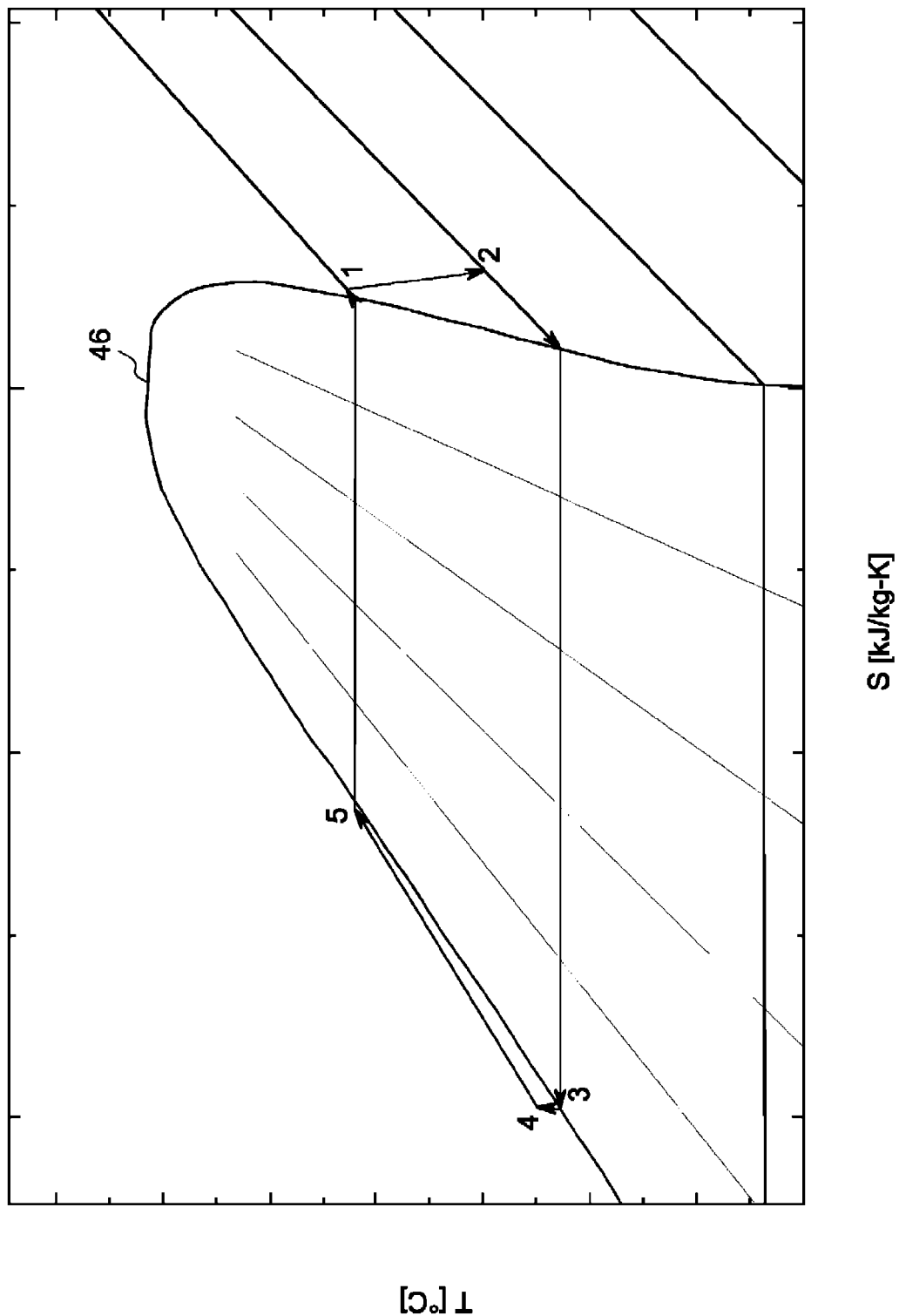
FIG. 2 is a diagrammatical view illustrating variation of temperature versus entropy in accordance with a conventional system.

Referring to FIG. 2, a temperature (expressed in degrees Celsius) versus entropy (expressed in kilojoules per Kilogram-Kelvin (KJ/Kg-K)) diagram in accordance with a conventional system is illustrated. A vapor dome is represented by the reference numeral 46. In the illustrated diagram, point 1 refers to the state of working fluid at the inlet of the expander. In other words, point 1 also refers to the state of working fluid after being heated at constant pressure in an evaporator by heat input from the heat generation system 16 to become a dry vapor. Point 2 refers to the state of working fluid at the exit of the expander i.e. the working fluid after expansion. Point 3 refers to the state of the working fluid after condensation in the condenser. Point 4 refers to the state of the working fluid after being passed through the pump provided between the condenser and evaporator. Point 5 refers to the state of the working fluid at the inlet of the evaporator 14 in systems with additional preheaters or to a state of the working fluid in the evaporator 14 after preheating is completed and evaporation of the fluid begins. It should be noted herein that point 1, point 2, and point 4 are located outside the vapor dome 46 and point 3 and point 5 are located along the vapor dome in accordance with the conventional system.

In accordance with the conventional system, the vapor quality of the working fluid at the inlet and at the exit of the expander is above 1 or equal to 1 at the inlet of the expander. In other words, the working fluid is fully vaporized or at a superheated state at the inlet and exit of the expander. The temperature and pressure of the working fluid are reduced during the expansion process. After expansion, the working fluid is desuperheated and then condensed.

Figure 3:
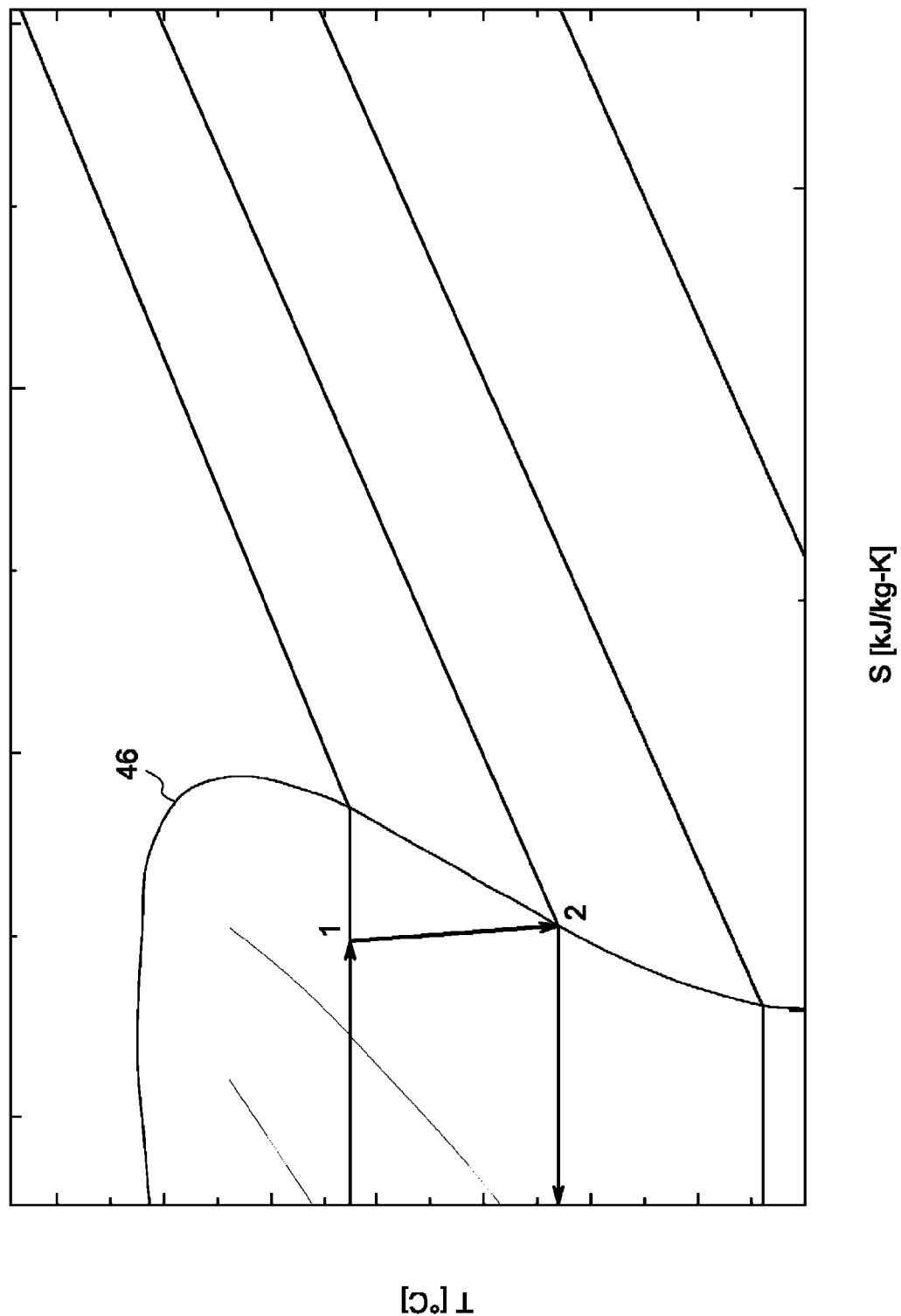
FIG. 3 is a diagrammatical view illustrating variation of temperature versus entropy in accordance with an exemplary embodiment of the present invention.

Referring to FIG. 3, a temperature (expressed in degrees Celsius) versus entropy (expressed in kilojoules per Kilogram-Kelvin (KJ/Kg-K)) diagram in accordance with an exemplary embodiment of the present invention is illustrated. A vapor dome is represented by the reference numeral 46. In the illustrated diagram, point 1 refers to the state of working fluid at the inlet of the expander. Point 2 refers to the state of working fluid at the exit of the expander i.e. the working fluid after expansion. It should be noted herein that point 1 is located within the vapor dome 46 and point 2 is located along the vapor dome.

In accordance with the exemplary embodiment of the present system, the vapor quality of the working fluid at the inlet of the expander is below 1. In other words, the working fluid includes wet vapor. The vapor quality of the working fluid at the exit of the expander is equal 1. In other words, the working fluid includes saturated vapor at the exit of the expander. The temperature and pressure of the working fluid are reduced during the expansion process. As discussed previously, in the exemplary embodiment, the controller controls the pump bypass control valve, speed of pump, condenser fan speed or water flow, speed of expander, expander inlet guide vane angle, heat input from heat source, or a combination thereof based on detected temperature and pressure of the working fluid at the exit of the expander so as to provide a vapor quality of the working fluid at the exit of the expander 18 approximately equal to one. In certain embodiments, when the expander is screw type expander, the vapor quality of working fluid is maintained below one at the inlet of the expander as illustrated in FIG. 3. In conventional systems, it is difficult to measure and maintain inlet vapor quality since vapor may be in a two-phase region. In accordance with the exemplary embodiments of the present invention, adjusting vapor quality at exit of expander to a predetermined degree of superheat allows back-calculation of vapor quality at the inlet of expander based on known expander efficiency, fluid data table/map or equations of state. The exemplary technique also allows adjustment of vapor quality at the inlet of the expander.

Referring to FIG. 4, a temperature (expressed in degrees Celsius) versus entropy (expressed in kilojoules per Kilogram-Kelvin (KJ/Kg-K)) diagram in accordance with an exemplary embodiment of the present invention is illustrated. A vapor dome is represented by the reference numeral 46. Similar to the previous exemplary embodiment, point 1 refers to the state of working fluid at the inlet of the expander. Point 2 refers to the state of working fluid at the exit of the expander i.e. the working fluid after expansion. It should be noted herein that in the illustrated embodiment, point 1 is located within the vapor dome 46 and point 2 is located slightly outside the vapor dome compared to the previous embodiment illustrated in FIG. 3. In other words, in the embodiment of FIG. 4, the degree of superheat is greater than zero. The selection of the predetermined degree of superheat for a particular design will depend on the fluid characteristics (drying/wetting etc) as well as the expander efficiency. For R245fa (pentafluoropropane), in one embodiment, the degree of superheat may be less than 50 K in one example or, more specifically, in the range of 20 K-30K in another example.

In accordance with the exemplary embodiment of FIG. 4, the vapor quality of the working fluid at the inlet of the expander is below 1, i.e. the working fluid includes wet vapor. In accordance with the exemplary embodiment of the present invention, under normal operating conditions, the vapor quality of the working fluid at the exit of the expander is slightly above 1. In other words, the working fluid may have a small degree of superheat at the exit of the expander compared to embodiment illustrated in FIG. 3 where point 2 is located on the saturated vapor line. The working fluid is then passed through the condenser for desuperheating and the condensation process.

Referring to FIG. 5, a plurality of sensed parameters, manipulating parameters, and output parameters for controlling thermodynamic conditions at an exit of an expander in an expansion system in accordance with an exemplary embodiment of the present invention is illustrated. As discussed previously, the controller 36 is configured to receive output signals 40, 42 representative of temperature and pressure from the sensors 32, 34 and control one or more components of the expansion system so as to control thermodynamic conditions at the exit 38 of the expander 18 so as to provide a quality of vapor of the working fluid at the exit 38 of the expander 18 at a predetermined degree of superheat. In the illustrated embodiment, the sensed temperature and pressure at the expander exit are referred to as the "sensed parameters".

The threshold limits for the thermodynamic conditions at the exit of the expander are determined based on a plurality of output parameters including but not limited to system efficiency, amount of heat extracted from the heat source, back flow temperature of heat source, condensation temperature, or a combination thereof. The relation between the output parameters and the sensed parameters is represented by transfer function "H". The controller 36 controls a plurality of manipulating parameters including but not limited to the pump bypass control valve 26, speed of pump 24, condenser fan speed/water flow, speed of expander 18, expander inlet guide vane angle, or a combination thereof based on detected temperature and pressure of the working fluid at the exit 38 of the expander 18 so as to provide a vapor quality of the working fluid at the exit of the expander 18 at a predetermined level of superheat. The relation between the manipulating variables and the sensed variables is represented by a transfer function "G".

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for controlling thermodynamic conditions at an exit of an expander of an expansion system; the method comprising:
    detecting temperature of a working fluid flowing through the exit of the expander;
    detecting pressure of the working fluid flowing through the exit of the expander; and
    controlling operation of at least one of a condenser, and an expander inlet guide vane of the expansion system based on detected temperature and pressure of the working fluid flowing through the exit of the expander so as to drive a quality of vapor of the working fluid at the exit of the expander towards a predetermined degree of superheat and maintain a quality of vapor of the working fluid at an inlet of the expander below one.

2. A method comprising:
    circulating a working fluid through a rankine cycle system coupled to a heat source, wherein circulating the working fluid comprises removing heat from the heat source; and
    detecting temperature of the working fluid flowing through an exit of an expander of the rankine cycle system;
    detecting pressure of the working fluid flowing through the exit of the expander of the rankine cycle system; and
    controlling operation of at least one of a condenser and an expander inlet guide vane based on detected temperature and pressure of the working fluid flowing through the exit of the expander so as to drive a quality of vapor of the working fluid at the exit of the expander towards a predetermined degree of superheat and maintain a quality of vapor of the working fluid at an inlet of the expander below one.

3. The method of claim 2, wherein circulating the working fluid through the rankine cycle system comprises circulating the working fluid through an evaporator, the expander, and the condenser.

4. The method of claim 3, further comprising transferring the working fluid from the condenser to the evaporator via a pump.

5. The method of claim 4, further comprising controlling flow of the working fluid from the condenser to evaporator via a pump bypass control valve provided in a pump bypass path between the condenser and evaporator.

6. The method of claim 5, comprising controlling the pump speed, the pump bypass control valve, or a combination thereof so as to control the thermodynamic conditions at the exit of the expander.

* * * * *